Patented Oct. 17, 1939

2,176,415

UNITED STATES PATENT OFFICE 2,176,415

ODORLESS, TASTELESS, RESIN AND METHOD FOR PRODUCING SAME

Clarence Bremer, Tamaqua, Pa., assignor to Atlas Powder Company, Wilmington, Del., a corporation of Delaware No Drawing. Application June 29, 1937, Serial No. 150,940

13 Claims. (Cl. 260—26)

This invention relates to a new type of soluble organic resinous condensation product, and to the method of making the same, and more particularly to a virtually odorless and tasteless reaction product of a hexahydric alcohol or inner ether thereof, rosin and certain dibasic acids.

The prime object of the invention is the preparation of soluble, ester-type organic resins which are substantially free of odor and taste.

Another object is the preparation of odorless and tasteless ester type resin wholly or partially free of tack, thus permitting use in different types of coating compositions, particularly for wrapping materials, such as paper or regenerated cellulose.

A further object is the preparation of substantially odorless and tasteless soluble ester-type resins, whose softening point can be varied within fairly wide limits, from about 110° to 145° C.

Other objects of the invention, including the novel method of making the resinous product, will appear from a consideration of the specification and claims.

The reaction of polyhydric alcohols with rosin is known to give a very useful type of resin, the so-called ester gum. This material has many of the characteristics desired in a resin, such as cheapness, light color, compatibility with other lacquer ingredients, and hardness, but the characteristic resinous odor which the rosin confers on it renders this type of resin unsuitable for many applications, particularly the making of papers and wrapping materials for food products and toilet articles.

I have found that soluble resinous products virtually free of odor and taste can be produced by reacting together at temperatures sufficient to cause a reaction to form an odorless, tasteless resinous complex but insufficient to caramelize the resinous product, gum rosin, straight chain hexahydric alcohols or inner ethers derivable therefrom, and hydroxyl-free, aliphatic, dibasic acids in which the carboxyl groups are separated by two or more carbon atoms, and by jetting or vacuum distilling the reaction product to remove substantially all volatile odor and taste producing reaction products from the reaction mixture.

These odorless, tasteless resins of the invention combine the very useful properties of ready solubility in coating composition solvents and vehicles, high softening point and the associated qualities of hardness and freedom from tack, with substantially complete freedom from odor and taste, the latter quality being hitherto unobtainable in the ester gum type resins. The resinous products of the invention find ready application and wide usefulness in the coating or impregnating of paper or other wrapping materials for use in food products, tobaccos, perfumed toilet articles, such as soaps and bath salts, flowers, and all other types of consumers merchandise where appeal is made to the senses of smell or taste as well as to the eye. The resins are excellently suited for coating compositions for the interior of rigid containers such as metal cans and cardboard or pressed wood pulp containers used for handling foods or beverages. Again, the resin may be used in compounding lacquers or coating compositions, to which an odoriferous substance, such as perfume, may be added, thus producing an imitation of perfumed or aromatic wood.

The valuable resinous products of the invention owe their lack of odor and taste to the particular ingredients and proportions thereof employed in the reaction mixture, as well as to the conditions under which the reaction takes place. When glycerol is substituted for the hexahydric alcohols, other ingredients and conditions remaining the same as in the production of the odorless, tasteless resins of the invention, the resin produced has distinct odor and taste and is no more suitable for the coating of wrapping materials for foodstuffs, etc., than the ester gums heretofore available. Similarly, aromatic acids such as phthalic; the hydroxyl-bearing, dibasic, aliphatic acids such as malic, tartaric; and the tribasic citric acid are not applicable. Malonic acid is too unstable at the required reaction temperatures for use. As will hereinafter more fully appear, the proportions of the ingredients employed in the reaction mixture, as well as certain conditions under which the reaction is carried out, must be confined to certain critical limits in the production of the odorless, tasteless resins of the invention.

The polyhydric substances suitable for use in the production of the resinous products of the invention are the straight chain hexahydric alcohols, such as sorbitol, mannitol and dulcitol, and the inner ethers derivable from the straight chain hexahydric alcohols, such as sorbitan, sorbide, mannitan, mannide, dulcitan and dulcide.

The inner ethers of the straight chain hexahydric alcohols are the ethers formed by the intramolecular condensation of the alcohol whereby 4 to 6 membered carbon-oxygen rings are formed. The inner ethers may be employed directly in the reaction with the monobasic and dibasic acids, or the hexahydric alcohol may be used, and the inner ether formed during the course of the formation of the resin. The same type of odorless, tasteless resin is formed in both cases. As the most convenient method of obtaining the inner ethers is by the condensation of the hexahydric alcohols, usually the intermediate step involving the preparation and separation of the inner ether is dispensed with, and the monobasic and dibasic acids are reacted directly with the hexahydric alcohol. If desired, the inner ether may be obtained from the hexahydric alcohol under any suitable dehydrating conditions; for example, by simple heating at temperatures of 140° C. or upwards. Preferably, however, the heating is carried out in the presence of a dehydrating catalyst of either a basic or acidic nature at temperatures of 140° C. and upwards.

When the hexahydric alcohol is employed as the original reactant the evidence points to the fact that the intramolecular condensation forming the inner ether takes place before the resin forming reaction, but part of the resin forming reaction may possibly take place first. If the latter does occur, however, it is to be understood that it falls within the scope of the invention and within the claims. The claims reciting the resinification of the inner ether are to be understood to include not only the use of the inner ether as the original reactant but also the use of the hexahydric alcohol from which the inner ether is formed.

In place of pure straight chain hexahydric alcohols there may be employed the syrups of these alcohols such as the product obtained by the reduction of glucose, which contains in addition to sorbitol and mannitol, ash, reducing sugar and small amounts of other organic impurities. When these syrups are employed, inner ether formation by intramolecular condensation of the hexahydric alcohol component takes place in the same manner as when pure straight chain hexahydric alcohols are used in the reaction.

The resinous acid employed is preferably commercial abietic acid or a gum rosin of a grade not lower than the WG rosin of the rosin standards adopted by the Bureau of Chemistry and Soils, U. S. Department of Agriculture. The reaction, in accordance with the present invention, of rosins of the grades WG, WW and X results in the ready production of odorless, tasteless resins, whereas resins formed from ordinary wood rosin of grades B to N fail to achieve satisfactory freedom from odor and taste.

Preferably, the hydroxyl-free, aliphatic, dibasic acids employed are those acids in which the total length of the carbon chain does not exceed six carbon atoms. Little is gained by the use of acids having a carbon chain in excess of eight carbon atoms, although the invention is not to be limited in this respect. Where convenient, the acid anhydride may be substituted for the corresponding dibasic acid.

Dibasic acids particularly applicable for use are maleic, fumaric, succinic, adipic and sebacic. Of these, maleic or its anhydride is preferable where high softening points are desired. Resinous reaction products of the hexahydric alcohols or inner ethers thereof, rosin and maleic acid are distinctly harder and less soluble than those obtained with succinic acid, the corresponding saturated dibasic acid. This result is probably due to the fact that maleic anhydride combines with rosin by diene addition to form a complex polybasic acid. This extra reactivity of maleic anhydride is not essential in the production of the odorless, tasteless resins of the invention, but the odorless, tasteless, resinous product of maleic acid are particularly useful where high softening points are desired.

In the production of the odorless, tasteless resins of the invention, it is a requirement that the total number of monobasic and dibasic acid equivalents present in the reaction mixture be substantially from 2.8 to 4.5 acid equivalents per mol of hexahydric alcohol or inner ether thereof. Below 2.8, particularly with maleic acid or anhydride as the dibasic acid, a sweetish odor appears. Above 4.5, the acid number is high and the odor of the original components persists. Between these limits, the desired ratio may be determined by the acid number which can be tolerated, the softening point desired, and the cost of the ingredients.

In the production of these resins, the dibasic acid mol fraction of the total acid component should be substantially from .05 to .35. For example, mol fractions of maleic acid below .05 lead to tacky products with a slight resin odor and when fractions above .35 are employed in the reaction mixture, the resins will go into the infusible, insoluble stage before the reaction can be extended sufficiently to produce an odorless, tasteless resin.

Mol fractions of maleic acid above .25 produce resins of limited solubility in lacquer solvents and with a tendency to go into the infusible, insoluble stage during preparation. The preferred maleic acid mol fraction of the total acid component is about .13, or, expressed as a mol ratio of dibasic acid to monobasic acid, .15.

When using the higher members of the series, such as adipic and sebacic, the higher mol fractions, namely .25 to .35, can be utilized more readily, since there is less tendency for the resinous products of these acids to become infusible and insoluble during their preparation. However, the use of the higher mol fractions of these acids is not advantageous since the color of the resin is impaired and the softening point decreases with increase in amount of the longer chain, dibasic acid. For these components, a mol fraction of from .10 to .20 is preferable.

The temperature employed in reacting the ingredients is sufficiently elevated to form the odorless tasteless complex and below that which would caramelize the product. When the reaction is conducted at pressures at or below atmospheric, reaction temperatures of from 285° to 310° C. may be employed. Reaction temperatures materially below 285° C. result either in a failure to form the odorless, tasteless complex, or in a failure to completely remove the odoriferous volatile matter. Temperatures materially above 310° C. result in caramelized products which have a definite taste. Preferably, a temperature in the neighborhood of 295° C. is employed.

Although with reaction temperatures of from 285 to 310° C. the dibasic acids employed enter the reaction in such a way as to render the resinous complex odorless and tasteless, it is necessary to remove the volatile, organoleptic materials, such as the volatile rosin oils produced by the decomposition of unreacted rosin under the resinifying temperatures, since these volatile materials are characteristically odoriferous. In order that these volatiles may be removed, the constituents should be reacted while substantially excluding air from the reaction mixture. Their removal can best be accomplished by jetting the reaction mixture with an inert gas such as carbon dioxide, or by vacuum distillation of the reaction mixture. If removal of odoriferous volatiles is accomplished in this manner, the odorless-tasteless resin of the present invention is produced when the yield of resin does not exceed 79% of the initial dry weights of the reactants.

In the following non-limiting examples, the reaction was carried out in covered vessels, for which aluminum is satisfactory, equipped with stirrers, means for jetting with an inert gas, and if desired, means for applying vacuum. The heating schedule was in all cases the same. The actual rate of flow of inert gas used in the jetting depends on the size of the batch and the design of the apparatus. The colors are those of standard rosin types.

Example I 237 lbs. WW rosin were charged into a covered aluminum resin kettle, arranged for jetting with an inert gas. The rosin was melted and heated to 120° C. when 74.7 lbs. of syrup containing 63.4 lbs. total polyhydric alcohol, and prepared by the alkaline reduction of glucose were added, followed by 12.75 lbs. of maleic anhydride. The temperature was then raised at 1° C. per minute, with constant stirring, to 295° C. and held there for 3 hrs. During the heating up period, a carbon dioxide flow of 7-8 cu. ft./min. was maintained. This was increased to 10-12 cu. ft./min. after the batch reached 295° C. The yield obtained was 70%, color F, acid number 17, and softening point 142° C. When cold, the resin was odorless and tasteless.

Example II 6 kg. WW rosin were charged into an aluminum vacuum kettle. The rosin was heated to 120° C. and 1 kg. of technical sorbitol obtained by the alkaline reduction of glucose, in the form of an 85% syrup was added, followed by 320 grams of maleic anhydride. The temperature was raised to 295° C. at 1° C. per minute, using a gentle flow of carbon dioxide to exclude air. At 227° C. a slight vacuum was applied, which was raised to 26" when the temperature reached 295° C. Heating at 295° C. under vacuum was continued for 3 hours. A 75.4% yield of odorless, tasteless resin, softening at 129° C., and of acid number 50 and color F was obtained.

Example III 300 grams WW rosin, 80 grams of pure crystalline mannitol and 23.2 grams crystalline adipic acid were reacted according to the heating schedules in Examples I and II, in a covered aluminum vessel. A carbon dioxide flow of .05 cu. ft./min. was maintained at all times during the reaction. A 65.7% yield of odorless, tasteless resin, softening at 127.5° C., and of acid No. 13 and color F was obtained.

Example IV 300 g. WW rosin was heated to 120° in a covered aluminum vessel when 80 g. crystalline sorbitol and 16 g. maleic anhydride were added. The temperature was raised at 1° C. per minute to 295° C. and held there for 3 hours, while a stream of carbon dioxide was passed through the stirred batch at .05 cu. ft. per minute. A 70% yield of an odorless, tasteless resin, softening at 143° C. and having an acid number of 21, and color I, was obtained.

Example V 300 g. WW rosin, 80 g. pure dulcitol and 16 grams of maleic anhydride were reacted as in Example IV, except that the carbon dioxide flow was reduced to .035 cu. ft. per minute. The odorless, tasteless resin obtained had a softening point of 140° C. color of H, and acid number of 19, at a yield of 74%.

Example VI 175 g. WW rosin, 40 g. technical sorbitol and 8 g. of sebacic acid were reacted as described in Examples IV and V, using 0.026 cu. ft. of $CO_2$ per minute for the entrainment. A 72.5% yield of an odorless, tasteless, tack-free resin, softening at 116.4° C., with an acid number of 22, and a color of E was obtained.

Example VII 300 g. WW rosin, 80 g. mannitol and 18.8 g. succinic acid were reacted as in Examples IV and V, except that the mannitol was added at 140° C. and a carbon dioxide flow of .054 cu. ft. per minute was employed. A 68% yield of an odorless, tasteless, tack-free resin, having a color of F, an acid number of 12, and a softening point of 132° C. was obtained.

The odorless-tasteless resins just described are soluble in benzene, toluol, ethyl acetate and chloroform, ethylene dichloride, and other common lacquer solvents, with the exception of ethyl alcohol. The use of higher amounts of maleic acid lowers the solubility of the resulting resins in oils, V. M. & P. naphtha, and acetone. All the other types are readily soluble in lacquer solvents, and are compatible with nitrocellulose films, and with drying oil base films.

Where flexibility is desired, this may be achieved without the use of volatile or odoriferous plasticizers, by using longer chain dibasic acids. If, however, resistance to solvent attack is of prime importance, the solubility can be decreased by using larger amounts of maleic acid,—all without sacrificing the essential features of freedom from odor and taste.

Non-limiting examples of coating compositions, and applications thereof utilizing the resins of the invention are as follows:—

Example VIII

A mixture of 1.5 lbs. of resin made as described in Example I, 0.32 lb. of Santicizer E-15 (ethyl phthalyl ethyl glycollate) and 0.32 lb. of purified paraffin wax melting at 62–64° C. were cut in one gallon of toluol, and spread on a thin, semi-transparent paper of the glassine type. After driving off the solvent at 65° C., the coated paper was clear of increased transparency, tack free and showed excellent resistance to moisture vapor.

Example IX

A mixture containing 65 parts of the resin made as described in Example I, 20 parts paraffin wax melting at 62–64° C., and 15 parts diethyl phthalate was cut with toluol to give a solution containing 15% solids. A glassine type paper dipped in this solution and dried at 65° C. showed excellent gloss, freedom from tack, and moisture proofness.

Example X

An ethylene dichloride solution of the resin from Example I, dibutyl phthalate, and LK-2 sec. nitrocellulose was made, containing 0.75 lb. of resin, 0.0825 lb. dibutyl phthalate, and 0.1 oz. of the nitrocellulose per gallon. The solution was used for impregnating small filter paper discs, for use in filtering. After drying at 65° C. for 2 hours, the discs were free of odor and were much stronger than before coating.

The above examples are merely illustrative, and not to be taken as limiting in any way the application of these odorless, tasteless resins, whose manifold applications will be instantly appreciated by those working in the field of coating compositions, packages, and containers.

It is to be understood that by the terms "odorless and tasteless" as used in the specification and claims, I mean a product which is substantially odorless and tasteless in a clean atmosphere at room temperatures, and do not imply that these resins have no odor or taste when heated or after standing in a contaminated atmosphere.

Having described my invention and given illustrative examples thereof, I claim:

1. The process of making an odorless, tasteless, resinous material which comprises heating a mixture consisting essentially of an inner ether derivable from a straight chain hexahydric alcohol, a monobasic acid selected from the group consisting of abietic acid and rosin of grades WG to X, and a hydroxyl-free, aliphatic, dibasic acid in which the carboxyl groups are separated by at least two carbon atoms, at temperatures sufficient to cause a reaction to form an odorless, tasteless, resinous complex but insufficient to caramelize said resinous product substantially excluding air from the reaction mixture throughout the reaction and removing volatile odor and taste producing reaction products from the reaction mixture, the total number of acid equivalents of said monobasic and dibasic acid present in the reaction mixture being substantially from 2.8 to 4.5 acid equivalents per mol of inner ether, and the dibasic acid mol fraction of the total acid present being substantially from .05 to .35.

2. The process of making an odorless, tasteless resinous material which comprises reacting at temperatures of from 285 to 310° C. a mixture consisting essentially of an inner ether derivable from a straight chain hexahydric alcohol, a monobasic acid selected from the group consisting of abietic acid and rosin of grades WG to X, and a hydroxyl-free, aliphatic, dibasic acid in which the carboxyl groups are separated by at least two carbon atoms, substantially excluding air from the reaction mixture throughout the reaction and removing volatile odor and taste producing reaction products from the reaction mixture to obtain a yield of resin not substantially greater than 79% of the initial dry weight of the reactants, the total number of acid equivalents of said monobasic and dibasic acid present in the reaction mixture being substantially from 2.8 to 4.5 acid equivalents per mol of inner ether and the dibasic acid mol fraction of the total acid present being substantially from .05 to .35.

3. The process set forth in claim 1 and wherein the dibasic acid is an acid selected from the group consisting of maleic, fumaric, succinic, adipic and sebacic.

4. The process set forth in claim 1 and wherein the dibasic acid is maleic.

5. The process set forth in claim 1 and wherein the dibasic acid is adipic.

6. The process set forth in claim 1 and wherein the dibasic acid is succinic.

7. The process of making an odorless, tasteless, resinous material which comprises reacting at about 295° C. a mixture consisting essentially of an inner ether derivable from a straight chain hexahydric alcohol, a monobasic acid selected from the group consisting of abietic acid and rosin of grades WG to X, and maleic acid, substantially excluding air from the reaction mixture throughout the reaction, and removing volatile odor and taste producing reaction products from the reaction mixture to obtain a yield of resin not substantially greater than 79% of the initial dry weight of the reactants, the total number of acid equivalents of said monobasic and maleic acid present in the reaction mixture being substantially from 2.8 to 4.5 acid equivalents per mol of inner ether and the maleic acid mol fraction of the total acid present being about .13.

8. The process of making an odorless, tasteless, resinous material which comprises reacting at about 295° C. a mixture consisting essentially of an inner ether derivable from a straight chain hexahydric alcohol, a monobasic acid selected from the group consisting of abietic acid and rosin of grades WG to X, and adipic acid, substantially excluding air from the reaction mixture throughout the reaction, and removing volatile odor and taste producing reaction products from the reaction mixture to obtain a yield of resin not substantially greater than 79% of the initial dry weight of the reactants, the total number of acid equivalents of said monobasic and adipic acid present in the reaction mixture being substantially from 2.8 to 4.5 acid equivalents per mol of inner ether, and the adipic acid mol fraction of the total acid present being from .10 to .20.

9. The process of making an odorless, tasteless, resinous material which comprises reacting at about 295° C. a mixture consisting essentially of an inner ether derivable from a straight chain hexahydric alcohol, a monobasic acid selected from the group consisting of abietic acid and rosin of grades WG to X, and succinic acid, substantially excluding air from the reaction mixture throughout the reaction, and removing volatile odor and taste producing reaction products from the reaction mixture to obtain a yield of resin not substantially greater than 79% of the initial dry weight of the reactants, the total number of acid equivalents of said monobasic and succinic acid present in the reaction mixture being substantially from 2.8 to 4.5 acid equivalents per mol of inner ether, and the succinic acid mol fraction of the total acid present being from .10 to .20.

10. An odorless, tasteless, resinous product made in accordance with the process set forth in claim 1.

11. An odorless, tasteless, resinous product made in accordance with the process set forth in claim 7.

12. An odorless, tasteless, resinous product made in accordance with the process set forth in claim 8.

13. An odorless, tasteless, resinous product made in accordance with the process set forth in claim 9.

CLARENCE BREMER.